United States Patent [19]
Black et al.

[11] Patent Number: 5,184,156
[45] Date of Patent: Feb. 2, 1993

[54] GLASSES WITH COLOR-SWITCHABLE, MULTI-LAYERED LENSES

[75] Inventors: Michael Black, Foster City; Vladimir Kupershmidt, Fremont, both of Calif.

[73] Assignee: Reliant Laser Corporation, Foster City, Calif.

[21] Appl. No.: 789,994

[22] Filed: Nov. 12, 1991

[51] Int. Cl.⁵ .............................................. G02C 7/10
[52] U.S. Cl. ................................... 351/158; 351/41; 351/44
[58] Field of Search ................. 351/44, 41, 45, 46, 351/47, 48, 49, 158; 359/64, 41, 57, 58, 66, 67, 68, 84, 85; 2/432

[56] References Cited
U.S. PATENT DOCUMENTS

| | | |
|---|---|---|
| 3,785,721 | 1/1974 | Harsch . |
| 4,039,254 | 8/1977 | Harsch . |
| 4,068,926 | 1/1978 | Nakamura et al. . |
| 4,232,948 | 11/1980 | Shanks . |
| 4,416,514 | 11/1983 | Plummer . |
| 4,697,884 | 10/1987 | Amstutz et al. . |
| 4,917,465 | 4/1990 | Conner et al. . |

*Primary Examiner*—Rodney B. Bovernick
*Attorney, Agent, or Firm*—D. Pressman

[57] ABSTRACT

Glasses with multilayered, color-switchable lenses (102) and (104) for blocking harmful radiation include a rim (100) connected to temples (108) and (110). The rim contains a photosensor (116), a color-changing switch (118), a dry-cell power source (120), solar cells (121) and (123), an electronic driver unit (122), and an electronic circuit (124). The color-switchable lenses comprise glass plates (126a), (126b), and (126c), conductive layers (136a), (136c) (142a), and (142b), color polarizers (138a) and (136c), alignment layers (140a), (140c), (146), and (148), a neutral polarizer (144), and liquid-crystal layers (158) and (160). When the photosensor determines that the intensity of incident radiation falls above or below the specified threshold, an amplified signal is sent via the circuit to the electronic driver unit which supplies layers 158 and 160 with voltages which cause the color-switchable lenses to change their spectral transmittance characteristics.

17 Claims, 4 Drawing Sheets

GLASSES WITH COLOR-SWITCHABLE, MULTI-LAYERED LENSES

BACKGROUND

1. Field of Invention

The present invention relates to the field electro-optics, particularly to color-switchable, harmful-radiation-blocking glasses. Such glasses find application in the laser industry (particularly medicine) and can also be utilized as fashion eyeware that changes the spectral content of incident radiation.

2. Description of Prior Art

At the present time, in the field of electro-optics, several methods exist for modifying the spectral composition of radiant energy.

A liquid crystal welding lens assembly, described in U.S. Pat. No. 4,039,254 to T. B. Harsch, 1977, employs several nematic-phase liquid crystal light shutters and three neutral polarizers alternately arranged in tandem. A nematic phase is a phase of a liquid crystal (LC) the liquid has a single optical axis in the direction of an applied electric field. A polarizer is a device which orients an incident electromagnetic wave in a predetermined direction With no electric field applied across the respective liquid-crystal cells, about 0.01% of the incident light will pass through the sandwich structure. On the other hand, when the electric field is simultaneously applied across the liquid-crystal cells, about 9% of incident light will be transmitted. Incorporated into the lens assembly is an electronic unit having a manually-operated ON-OFF switch. The electronic control system of the welding lens assembly utilizes two phototransistors and two light filters, one of which passes visible light, other of which passes infrared energy only.

One of the disadvantages of the above lens assembly is its considerable size. This is because the device contains an infrared protective window which is very thick. Moreover, the welding lens blocks all visible light, providing extremely poor visibility in the absence of the welding arc. Furthermore, the lens can not selectively block a specific spectral range of light. Also, the specific design of the liquid crystals of the device limits the minimum achievable switching time of the lens to approximately 50 ms.

An apparatus disclosed in U.S. Pat. No. 4,416,514 to W. T. Plummer, 1983, includes neutral, cyan, magenta, and yellow polarizers, interposed in a series of twisted nematic cells. By varying the volta applied to each cell, the twist angles of the liquid-crystal molecules change, imparting a variable rotation of the light exiting the cell. The colored polarizers cooperate with this controllably twisted light to produce desired colors.

However, the above apparatus has several drawbacks. Parallax, inherent in any stacked optical system, is present because the path of light shifts slightly as radiation travels through the liquid crystal cells. Furthermore, this apparatus is not sensitive to the time dependence of incident light, i.e., it cannot automatically block out harmful radiation if its intensity achieves the threshold harmful for human vision and it will not let more light through as the radiation level decreases. That is, if the intensity of incident radiation changes as a function of time, this device is not able to synchronously control the transmissivity of incident light.

Moreover, the devices described above produce contamination of the desired color, which is due to the fact that the utilized LC cells used are not tunable to a particular desired color.

A display system, shown in U.S. Pat. No. 4,917,465 to A. R. Conner et al., 1990, is formed by stacking three supertwisted nematic (STN) LCD panels that are tuned to different subtractive primary colors, i.e., yellow, cyan, and magenta. Interposed between the panels are polarizers, some of which may be colored to enhance color characteristics and to improve brightness. An STN panel is an LC cell in which the distance between the support plates is smaller than 10 μm and the total twist of the LC is between 180° and 360°, preferably about 270°. The STN cells provide a direct-multiplexed display composed of a plurality of pixels. For a high resolution color display, an arrangement of at least 640 by 640 pixels is required.

This display system requires a pixel array controlled by a sophisticated electronic driver system, which is expensive and is difficult to manufacture. Since display systems of this type are intended to create images, they require a powerful light source. Moreover, common problems associated with pixel arrays are low brightness and poor color contrast.

Besides the disadvantages mentioned above, all of the above prior-art systems utilize plastic polarizers placed at the periphery of the liquid-crystal cells, leaving them exposed to the elements. Such an arrangement allows dirt contamination and, in some cases, physical damage of the polarizers.

OBJECTS AND ADVANTAGES

It is accordingly an object of the invention to provide glasses with color-switchable, multilayered lenses, which overcome the foregoing disadvantages, which can selectively block a specific spectral range of incident radiation, and which provide high white light transmissivity in the absence of harmful radiation. Another object is to provide a device of the aforementioned type having a color-sensitive liquid-crystal cell. Still another object is to provide a device which is noiseless in operation, is able to automatically switch the multilayered lenses of the color-switchable glasses from the wavelength sensitive state (color) to broadband spectral state (neutral) synchronously with changes in incident radiation intensity when the latter is a periodic function of time. A further object is to provide an apparatus having a multilayered liquid crystal cell with polarizers incorporated inside the cell in order to protect the polarizers and decrease the physical dimensions and manufacturing cost of such cell. A still further object is to provide a device with the lens switching speed on the order of a microsecond. Further advantages and features will become apparent from a consideration of the ensuing description and drawings.

REFERENCE NUMERALS USED IN THE DRAWINGS AND DESCRIPTION

100—rim
102, 104—lenses
106—bridge
108, 110—temples
112, 114—butt straps
116—photosensor
118—color-changing switch
120—dry cell power source
121, 123—solar cells
122—electronic driver unit
125—multilayered cell
126a, 126b, 126c—glass plates
128a, 128b, 130a, 130b—spacers
X, Y—azimuthal axes
132—optical path
134a, 134c—inner surfaces
136a, 136b, 136c, 136d—transparent conductive layers
138a—first color polarizer
138c—third color polarizer
140a, 140c, 146, 148—alignment layers
144—neutral polarizer
150, 152, 154, 156—electrical leads
158, 160—liquid crystal layers

Figure 1:
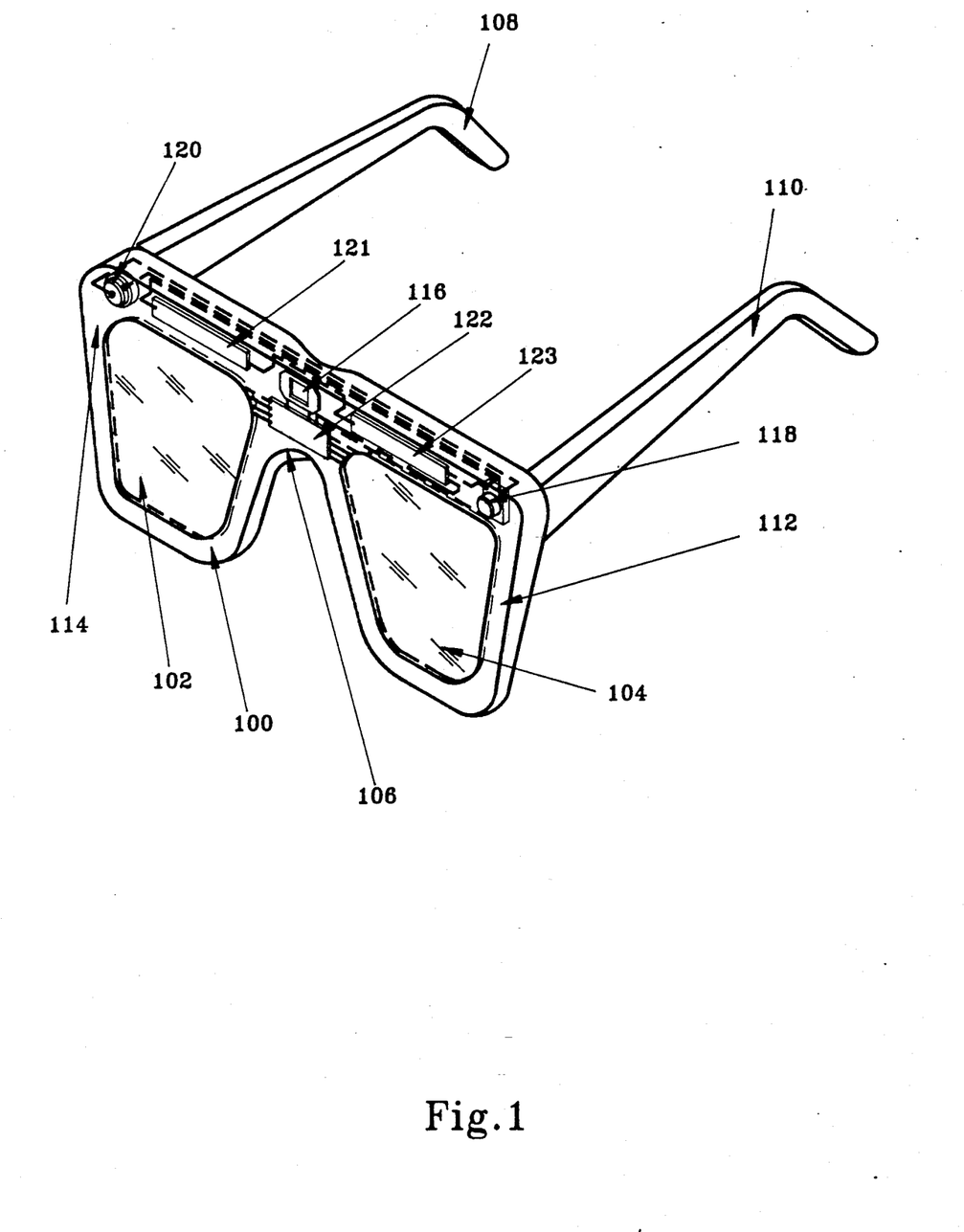
FIG. 1 is a perspective view of a pair of glasses according to the invention.

FIG. 1 —DESCRIPTION

A perspective view of a pair of glasses according to the invention is shown in FIG. 1.

The glasses contain multilayered lenses 102 and 104 which are color switchable. They have a rim 100, which supports lenses 102 and 104, and an interconnecting bridge 106. Temples 108 and 110 are connected to rim 100 by respective hinges (not shown). The portions of the rim on which the hinges for temples 108 and 110 are mounted are known as butt straps and are designated by reference numerals 112 and 114.

The glasses have several parts embedded into the plastic material of rim 100. These are a photosensor 116 located over bridge 106, a color-changing switch 118 mounted in righthand butt strap 112, a dry cell power source 120 located in a lefthand butt strap 114, photovoltaic cells 121 and 123 mounted in rim 100, an electronic driver unit 122 incorporating an amplifier, and electronic circuitry, broadly designated by reference numeral 124, which is etched inside rim 100 using known photo-lithography techniques.

Photosensor 116 incorporates interference filters (not shown) having a transmittance band which corresponds to the wavelength of incident radiation. The transmittance bands of the aforementioned filters lie inside the spectral response range of the photosensor and correspond to about 100 nm.

Figure 2:
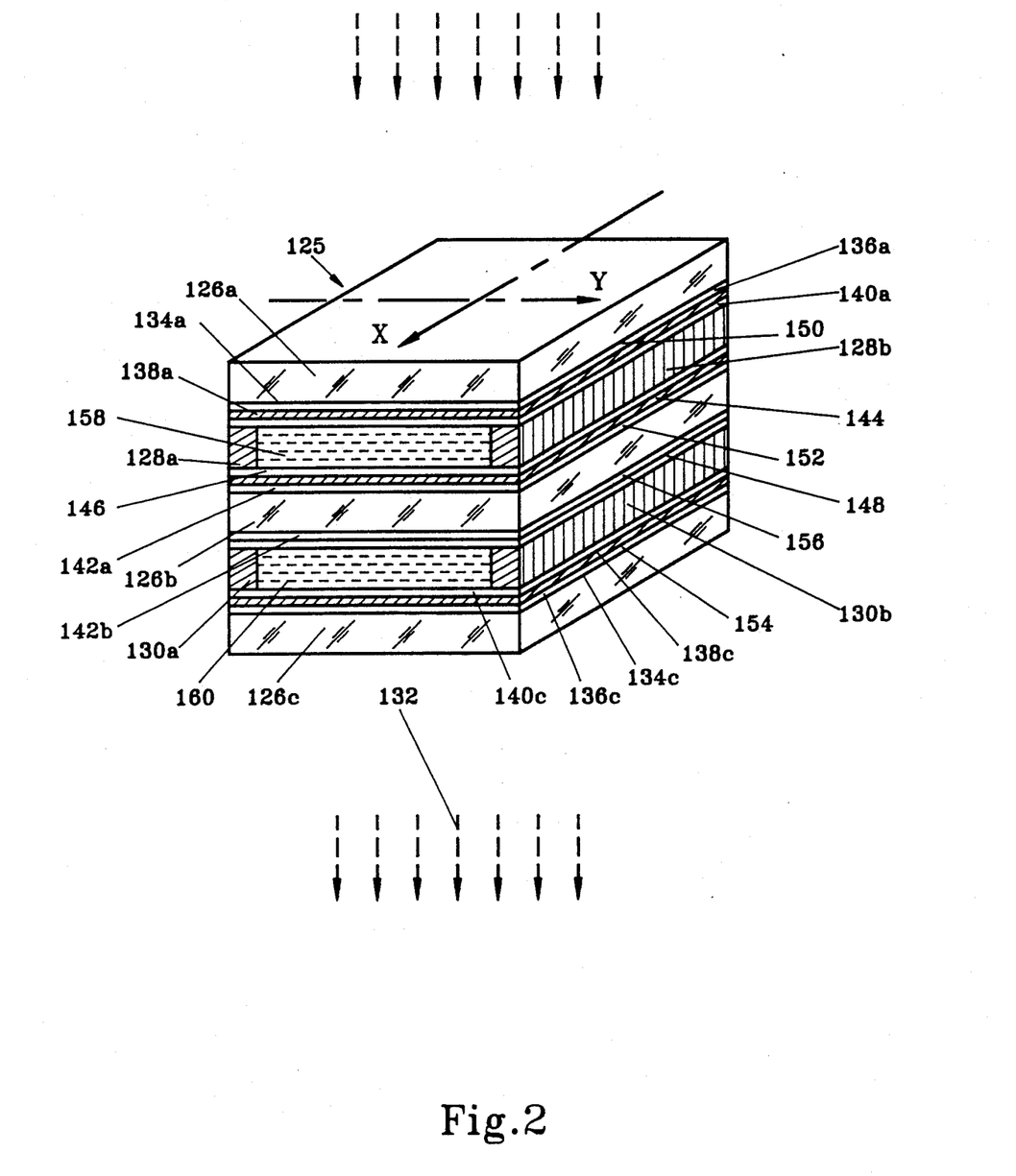
FIG. 2 is a perspective view depicting the construction of a color-switchable lens of the glasses.

FIG. 2—CONSTRUCTION OF COLOR-SWITCHABLE LENS

The preferred construction of lenses 102 and 104 is shown in detail in FIG. 2.

The lens of the glasses of the invention can be selectively switched from a first color (#1) to a second color (#2) to colorless. It comprises a color tunable multilayered cell 125 containing glass plates 126a, 126b, and 126c, spacers 128a and 128b situated between plates 126a and 126b, and spacers 130a and 130b sandwiched between plates 126b and 126c.

FIG. 2 also shows azimuthal axes X and Y, as well as the light path, designated 132.

Plates 126a and 126c have facing inner surfaces 134a and 134c, which are coated with transparent conductive coating layers 136a and 136c of indium tin oxide. Layer 136a is laminated with a first color polarizer 138a and layer 136c is laminated with a second color polarizer 138c. An alignment layer 140a is applied to polarizer 138a and an alignment layer 140c is applied to polarizer 138c.

Both sides of plate 126b are covered with transparent conductive coating layers 142a and 142b. Layer 142a is laminated with a neutral polarizer 144. Alignment layers 146 and 148 are applied onto polarizer 144 and layer 142b.

Spacer 128b contains electrical leads 150 and 152 and spacer 130b contains electrical leads 154 and 156.

A liquid-crystal layer 158 is sandwiched between alignment layers 140a and 146 and a liquid crystal layer 160 is sandwiched between alignment layers 148 and 140c. Each liquid-crystal layer is "tuned" to a specific wavelength corresponding to a particular color, which is to be filtered out. As will be explained in detail below, the blocked wavelength is determined by the thickness of a given liquid crystal layer.

Alignment layers 140a, 146, 148, and 140c may be formed by buffering the polymer or by oblique incident deposition of inorganic material, such as SiO, directly onto the polarizers. The deposition of inorganic materials onto polarized polymer films can be performed by Optical Coating Laboratories, Inc., Santa Rosa, Calif.

FIG. 2 does not show the orientations of the optical axes of the polarizers and the directions of the alignment layers of liquid crystals. Moreover, the liquid crystal type will be determined by either the switching speed of the lens from colored to colorless and/or the minimum applied voltage.

A first criterion for choosing the liquid crystal will be utilized when the glasses are used for filtering scattered radiation, the intensity of which is a function of time. A second criterion is used when the glasses are utilized for filtering radiation having constant intensity, e.g., sunlight. At the present time, the first criterion is satisfied by a ferroelectric type of liquid crystal, while a supertwisted nematic crystal is the appropriate choice for satisfying the second criterion.

Examples of companies that manufacture ferroelectric liquid crystals are Display Tech, Inc., and Chisso Co. These crystals possess a switching voltage range of −15 V to +15 V and a rise time between 10 and 50 microseconds. STN crystals having a switching voltage range of 1.8 V to 2.2 V and a rise time of approximately 50 msec, are produced by Kyocera Company and LXD Inc.

Even though other liquid crystal types can be utilized for the above purposes, the aforementioned varieties are the most effective. Unfortunately, no liquid crystals satisfying both requirements currently exist.

The mutual orientation of the optical axes of the polarizers and liquid crystals depends on the liquid crystal type. As an example, an orange-green-colorless combination for a ferroelectric liquid crystal can be provided. Lenses of these colors can be used as blocking filters for harmful radiation, the maximum intensity of which lies in a specific narrow spectral range. For instance, a green lens is able to block scattered laser radiation having a wavelength of 1064 nm.

Figure 3:
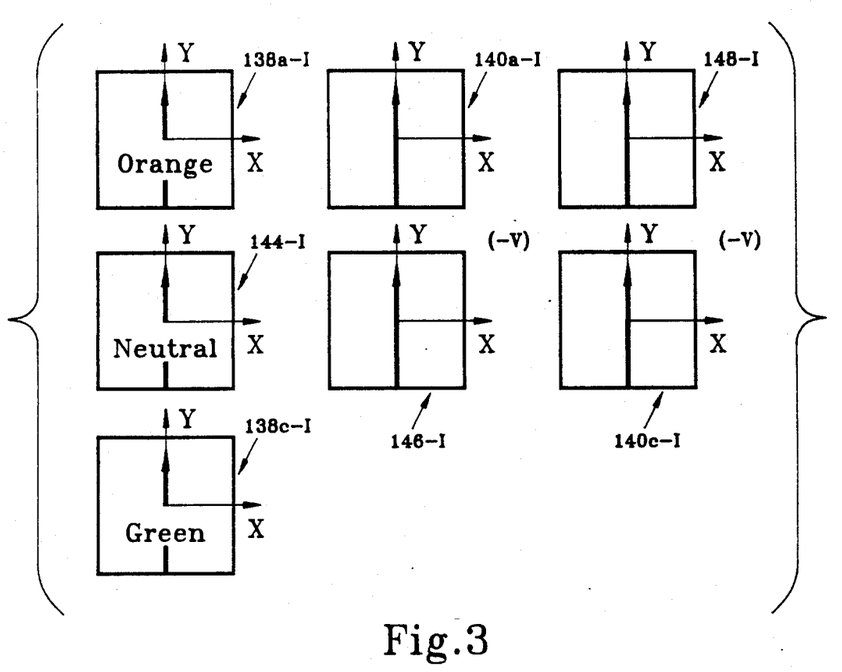
FIG. 3 is a schematic drawing of geometrical planes, containing layer and polarizer optical axes of a ferroelectric multilayered liquid crystal cell used in the glasses of the invention.

FIG. 3—STRUCTURE OF A MULTILAYERED FERROELECTRIC LIQUID CRYSTAL CELL

FIG. 3 is a schematic drawing of a multilayered ferroelectric liquid crystal cell depicting geometric planes which contain optical polarizer axes 138a-I (orange), 144-I (neutral), and 138c-I (green), and alignment layer axes 140a-I, 140c-I, 146-i, and 148-I; The polarizer and alignment layer axes are parallel to the Y-axis.

Figure 4:
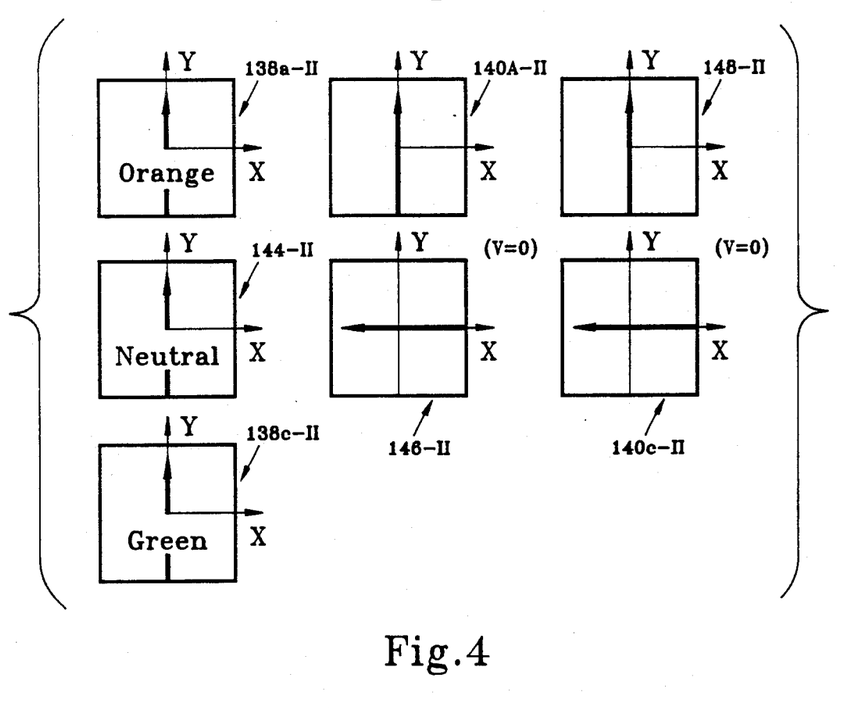
FIG. 4 is a schematic drawing of geometrical planes containing axes of the alignment layer and polarizer in a supertwisted multilayered cell used in the glasses of the invention.

FIG. 4—STRUCTURE OF A SUPERTWISTED NEMATIC LIQUID CRYSTAL UNIT

FIG. 4, a schematic drawing, of a supertwisted nematic liquid crystal unit, shows geometric planes that contain optical polarizer axes 138a-II (orange), 144-II (neutral), and 138c-II (green) which are parallel to the Y-axis. They also have alignment layer axes 140a-II and 148-II which are parallel to the Y-axis, and alignment layer axes 146-iI and 140c-II, which are parallel to the X-axis.

Any required color can be obtained by stacking polarizers of different spectral characteristics and respective optical axes. For example, an orange polarizer can be made by combining red and yellow polarizers with crossed polarization axes or can be manufactured directly. Such an arrangement can be utilized when a polarizer having needed spectral characteristics can not be manufactured directly. Moreover, stacking two polarizers having identical spectral characteristics allows the optical density to be increased.

As was mentioned above, a tunable multilayered cell will be composed of wavelength-tunable liquid-crystal layers which utilize the birefringent properties of liquid-crystals. This implies that the thickness of any given liquid-crystal layer, tuned to a given wavelength of incident radiation, will be determined from the required total optical density of the multilayered cell designed for a given wavelength. The thickness of a given liquid crystal layer is determined from the following equations:

$$T^{(l)}_{eff}(\lambda) = \frac{10^{-(OD_{tot}(\lambda) - OD^{wave}_{pel.}(\lambda))}}{T^{paralt}_{pel.}(\lambda) \; T^{(2)}_{en}(\lambda)}$$

$$T^{(l)}_{eff}(\lambda) = \sin^2 \pi \sqrt{\left(\frac{\Delta n \cdot d}{\lambda}\right)^2 + \left(\frac{\Theta}{\pi}\right)^2}$$

where $\lambda$ is the wavelength of scattered laser light;
$\Theta$ is the twist angle, which is in the range between 240° and 270° for an STW crystal and is zero for a ferroelectric crystal;
$\Delta n$ is the birefringence constant of the liquid crystal layer;
$d$ is the thickness of a given layer;

$T_{off}^{(1)}$ is the transmittance of the first liquid crystal layer 158 in its OFF state;
OD is the total optical density of the multilayered cell 125;
OD is the optical density of polarizer 138a and neutral polarizer 144, corresponding to crossed orientation of their optical axes;
T is the transmittance of neutral polarizer 144 and polarizer 138c, corresponding to parallel orientation of their optical axes;
$T_{on}^{(2)}$ is the transmittance of second liquid crystal layer 160 in its ON state;

When the total optical density of the multilayered ferroelectric liquid crystal cell corresponding to $\lambda = 514$ nm is equal to 4, $$OD^{wave}_{pel.} = 3, \quad T^{paralt.}_{pel.} = 0.75$$
$$T^{(2)}_{en} = 0.8, \quad \Delta n = 0.2, \Theta = 0$$

Then, the thickness d of the ferroelectric liquid crystal layer tuned for $\lambda = 514$ nm is equal to 2.23 nm.

Ordinarily, when the glasses are used for blocking scattered laser light, the required optical density of light $(OD = -\log T)$ for a given wavelength is 3.5 to 5, which is sufficient for most medical and industrial applications. Powerful sources of laser light necessitate a specific design for color polarizers.

Figure 5:
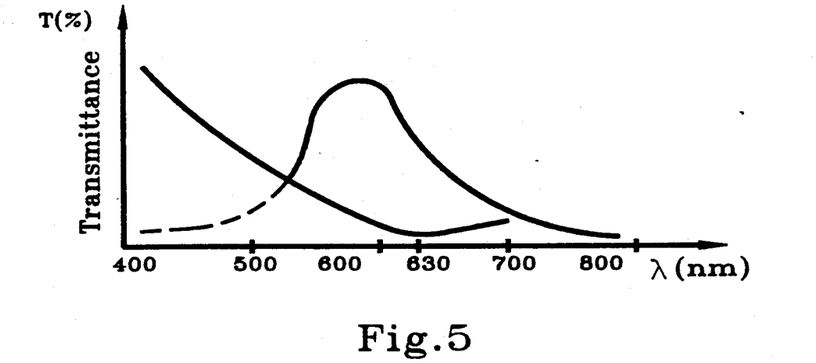
FIG. 5 the individual transmittance characteristics of unpolarized light for orange and neutral polarizers with crossed optical axes, and a liquid crystal layer used in the glasses of the invention.

FIG. 5—TRANSMITTANCE CHARACTERISTICS OF UNPOLARIZED LIGHT

FIG. 5 shows transmittance characteristics of unpolarized light. The humped curve shows the transmittance characteristics when unpolarized light passes through a pair of polarizers 138a-1 (orange) and 144-1 (neutral) with crossed optical axes. The mainly descending curve, shows the transmittance characteristics when polarized light passes through the wavelength-tunable liquid crystal.

Figure 6:
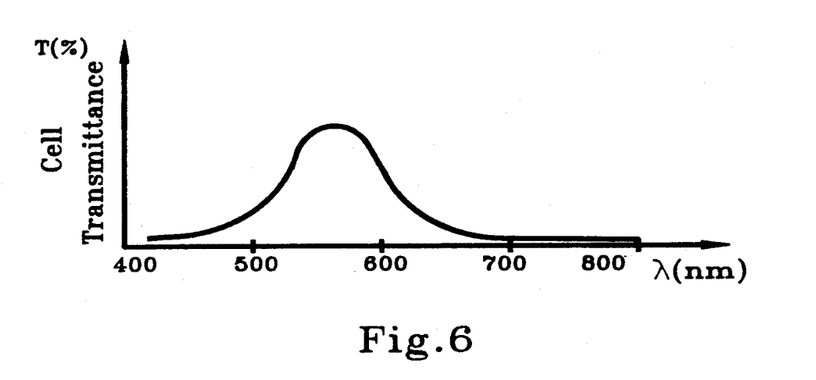
FIG. 6 is a plot representing the total OFF state transmittance of unpolarized light which passes through two crossed polarizers and a liquid crystal layer of the glasses of the invention.

FIG. 6—TOTAL OFF-STATE TRANSMITTANCE

FIG. 6 is a plot of the total OFF-state transmittance (orange polarizer, neutral polarizer, and liquid crystal layer) which is the product of the transmittances represented by curves 162 and 168. From the above figure it is clear that by choosing the appropriate thickness of liquid crystal, suppression of total transmittance for specific wavelengths of light can be achieved.

It should be noted that the OFF state for different liquid crystal types is determined differently. For example, for a ferroelectric liquid crystal, the OFF state is obtained when a voltage of positive sign is applied, in which case the optical axes of the ferroelectric liquid crystal will comprise an angle of 45° with the optical axes of the polarizers. For an STN crystal, where the inactivated (voltage not applied) liquid-crystal layers rotate the plane of polarization of incident radiation through 270°, the OFF state occurs when no voltage is applied. The ON state for a ferroelectric liquid crystal corresponds to a negative applied voltage. The ON state for an STN crystal corresponds to a maximum applied voltage, regardless of its sign. The ON state signifies minimal absorption of intensity of incident radiation along the visible spectral range.

The OFF and ON states of a ferroelectric liquid crystal correspond to energized states having voltage of different sign, while only the ON state of an STW crystal is energized. One of the distinguishing features of an STW crystal is a narrow transition range between its OFF and ON states.

In one specific example, the multilayered liquid crystal cell had a thickness of approximately 2 mm and the frame of the glasses was made of plastic.

FIGS. 4 THROUGH 8—OPERATION

The following is a description of the operation of the multilayered liquid crystal cell, which forms the integral lenses of the color-switchable glasses. The following discussion relates to one application of the glasses which employ a ferroelectric-type liquid crystal and are intended for filtering of scattered argon laser light ($\lambda = 514$ nm) or scattered Nd:YAG laser light ($\lambda = 1064$ nm). Such light must be filtered because it is harmful to human eyes. It is known in the art that an orange filter is able to effectively absorb wavelengths corresponding to the argon laser, while a dark green filter can absorb wavelengths corresponding to the Nd:YAG laser.

Figure 7:
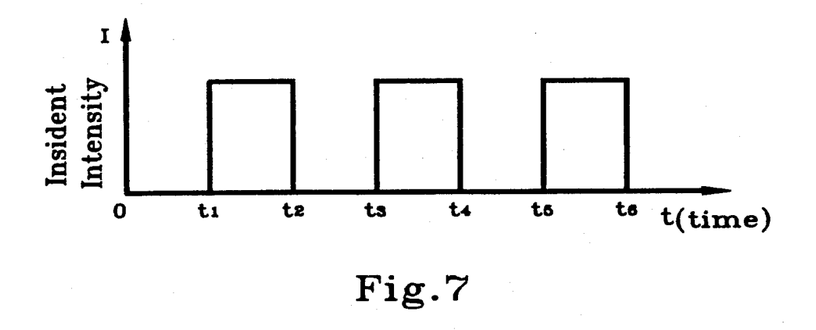
FIG. 7 shows the time dependence of the intensity of incident radiation of the glasses of the invention.

FIG. 7—TIME DEPENDENCE OF INCIDENCE RADIATION INTENSITY

FIG. 7 shows one of the possible time dependence curves of incident radiation intensity. In the case when the above curve represents the time dependence of intensity of the argon laser light that is necessary when layer 160 is constantly in the ON state. During time intervals t1 to t2, t3 to t4, t5 to t6, etc., layer 158 has to be "tuned" to the wavelength of incident light, e.g., OFF state, while during intervals t0 to t1, t2 to t3, t4 to t5, etc., layer 158 is in the ON state (colorless). This synchronization between the intensity of incident radiation and the ON/OFF switching of layer 158 will be accomplished with the use of photosensor 116, which determines the intensity of incident radiation.

When this intensity falls above or below the minimum threshold, an amplified signal is sent via a circuit to electronic driver unit 122, which switches layer 158 to ON or OFF states and is energized by dry cell power source 120 and/or solar cells 121 and 123. Solar cells 121 and 123 may complement the dry cell or can replace it when the glasses are used in outdoor applications.

Figure 8:
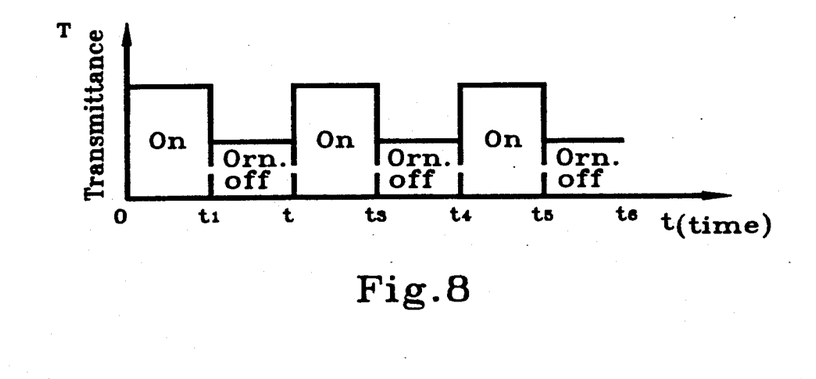
FIG. 8 is a plot representing the transmittance of scattered laser light a multilayered liquid crystal cell used in the glasses of the invention.

In order to obtain the same transmittance suppression at the exit of the integral lens unit, the transmittance of second liquid-crystal layer 160 should have a maximum value whole visible light spectrum (white light). For this purpose, it is necessary to switch layer 160 to the ON state by applying the maximum voltage to second liquid-crystal layer 160. FIG. 8 shows the transmittance of scattered laser light through multilayered cell 125 as a function of time.

In the case when scattered Nd:YAG radiation is present, layer 158 is constantly in the ON state, while layer 160, which is "tuned" for a wavelength corresponding to green color, alternatively operates in OFF/ON states.

SUMMARY, RAMIFICATIONS, AND SCOPE

Thus, it has been shown that we have provided a multilayered-lens color-switchable glasses that selectively block a specific spectral range of incident radiation, the intensity of which is a periodic function of time and provides a high transmissivity of white light in the absence of harmful radiation.

Although the multilayered-lens color-switchable glasses have been shown and described in the form of one specific embodiment, its parts, materials, and configurations are given only as examples, and many other modifications of the apparatus are possible. For example, the multilayered liquid crystal cell of the invention may be "tuned" to only one specific radiation wavelength eliminating the necessity for one of the liquid-crystal layers. Furthermore, the single construction of the liquid-crystal cell can be utilized in sunglasses when an ultraviolet coating is applied to the exterior of the cell. Since sunglasses are used to protect the eyes from radiation with constant intensity, the construction of the eyeware is further simplified because the photosensor and its power source are eliminated. When utilized in sunglasses, the lenses may be set in a variety of fashionable frames. The glass plates of the multilayered liquid-crystal cell can be substituted with plates made of high-optical-quality plastic plates. The multilayered liquid-crystal cell can be constructed from two discrete units, each having a liquid-crystal layer sandwiched between two pieces of glass. Each of these units should be tuned for a specific wavelength of incident radiation. The color-switchable lenses can be flat or can have curvatures and are integrated into the rim of the glasses in such a way that they can be easily removed and replaced. Moreover, the multilayered liquid-crystal cells can be used as ocular color filters or internal safety filters for a microscope. Therefore, the scope of the invention should be determined, not by the examples given, but by the appended claims and their legal equivalents.

What we claim is:

1. A pair of multilayered-lens, color-switchable glasses, comprising:
   a frame having a rim portion and temples;
   multilayered lens means for selectively filtering incident radiation, said multilayered lens means being mounted within said rim portion, said multilayered lens means being arranged to change color in response to an electrical input thereto;
   photodetector means for determining the intensity level of incident radiation;
   color-switching means for supplying an electrical input to said multilayered lens means for changing the color of said multilayered lens means;
   electronic control means for changing the optical properties of said multilayered lens means;
   an electronic circuit connected to said electronic control means; and
   power supply means for supplying electrical energy to said control means via said electronic circuit.

2. The multilayered-lens color-switchable glasses of claim 1 wherein said photodetector means, said color-switching means, said electronic control means, said electronic circuit, and said power supply means are mounted within said frame.

3. The multilayered-lens color-switchable, glasses of claim 1 wherein said multilayered lens means comprises a multi-layered liquid crystal cell.

4. The multilayered-lens color-switchable glasses of claim 3 wherein said multi-layered liquid crystal cell includes at least one liquid crystal layer, at least two glass plates, at least one color and one neutral polarizer, at least two alignment layers, at least two conductive layers containing electrical output terminals, and at least two spacers, said polarizers being incorporated within said multi-layered liquid crystal cell, said electrical output terminals being connected to said electronic circuit.

5. The multilayered-lens color-switchable glasses of claim 4 wherein said multi-layered liquid crystal cell includes an intermediate glass plate, the top surface of said intermediate glass plate being consecutively covered with a upper conductive layer, a neutral polarizer, and an upper alignment layer, the bottom surface of said intermediate glass plate being consecutively covered with a lower conductive layer and a lower alignment layer, a first liquid crystal layer being placed next to said upper alignment layer and a second liquid crystal layer being positioned next to said lower alignment layer, the top side of said first liquid crystal layer being consecutively covered with a top alignment layer, a first color polarizer, a top conductive layer, and a top glass plate, the bottom side of said second liquid crystal layer being consecutively covered with a bottom alignment layer, a second color polarizer, a bottom conductive layer, and a bottom glass plate, the thicknesses of said liquid crystal layers being determined by four spacers, located at the periphery of said liquid crystal layers.

6. The multilayered-lens color-switchable glasses of claim 5 wherein said upper, lower, top, and bottom alignment layers are made of an inorganic material.

7. The multilayered lens color-switchable glasses of claim 4 wherein the optical axes of said color and neutral polarizers are parallel to each other and an arbitrary Y-axis, the orientations of the optical axes of said liquid crystal alignment layers with respect to the azimuthal axes X and Y corresponding to the type of said liquid crystal layer.

8. The multilayered-lens color-switchable glasses of claim 7 wherein said liquid crystal layer is a ferroelectric liquid crystal.

9. The multilayered-lens color-switchable glasses of claim 7 wherein said liquid crystal is a supertwisted liquid crystal.

10. The multilayered-lens color-switchable glasses of claim 1 wherein said photodetector means comprises a photosensor.

11. The multilayered-lens color-switchable glasses of claim 1 wherein said color-switching means comprises a color changing switch.

12. The multilayered-lens color-switchable glasses of claim 1 wherein said electronic control means comprises an electronic driver unit incorporating an amplifier.

13. The multilayered-lens color-switchable glasses of claim 1 wherein said power supply means includes a dry cell.

14. The multilayered-lens color-switchable glasses of claim 1 wherein said power supply means includes a solar cell.

15. A pair of multilayered-lens, color-switchable glasses, comprising:
a frame having a rim portion and temples;
a multilayered liquid crystal cell including at least one liquid crystal layer, at least two glass plates, at least one color and one neutral polarizer, at least two alignment layers, at least two conductive layers containing electrical output terminals, and at least two spacers, said polarizers being incorporated within said multi-layered liquid crystal cell, said electrical output terminals being connected to said electronic circuit, said multilayered liquid crystal cell being mounted within said rim portion;
a photosensor;
a color-changing switch;
a dry cell and an auxiliary solar cell;
an electronic driver unit incorporating an amplifier; and
an electronic circuit operatively connecting said multi-layered liquid crystal cell, said photosensor, said color changing switch, said dry and auxiliary solar cells, and said electronic driver unit.

16. The multilayered-lens color-switchable glasses of claim 15 wherein said photosensor, said color-changing switch, said dry and said auxiliary solar cells, said electronic driver unit, and said electronic circuit are mounted into said frame.

17. The multilayered-lens color-switchable glasses of claim 15 wherein said multilayered liquid crystal cell includes an intermediate hard plastic plate, the top surface of said intermediate hard plastic plate being consecutively covered with a upper conductive layer, a neutral polarizer, and an upper alignment layer, the bottom surface of said intermediate hard plastic plate being consecutively covered with a lower conductive layer and a lower alignment layer, a first liquid crystal layer being placed next to said upper alignment layer and a second liquid crystal layer being positioned next to said lower alignment layer, the top side of said first liquid crystal layer being consecutively covered with a top alignment layer, a first color polarizer, a top conductive layer, and a top hard plastic plate, the bottom side of said second liquid crystal layer being consecutively covered with a bottom alignment layer, a second color polarizer, a bottom conductive layer, and a bottom hard plastic plate, the thicknesses of said liquid crystal layers being determined by four spacers, located at the periphery of said liquid crystal layers, the outside surfaces of said top and bottom hard plastic plates being covered with a hard ultraviolet protective coating.

* * * * *

UNITED STATES PATENT AND TRADEMARK OFFICE
CERTIFICATE OF CORRECTION

PATENT NO. : 5,184,156
DATED : February 2, 1993
INVENTOR(S) : M. Black, et al

It is certified that error appears in the above-indentified patent and that said Letters Patent is hereby corrected as shown below:

Col. 1, l. 22, after "liquid crystal (LC)" insert —in which—.
Col. 5, l. 24, after "drawing" delete ",".

Signed and Sealed this

Twenty-seventh Day of September, 1994

Attest:

BRUCE LEHMAN

Attesting Officer

Commissioner of Patents and Trademarks